United States Patent [19]

Braunlich

[11] 4,287,553

[45] Sep. 1, 1981

[54] CAPACITIVE PRESSURE TRANSDUCER

[75] Inventor: Peter F. Braunlich, Pullman, Wash.

[73] Assignee: The Bendix Corporation, Southfield, Mich.

[21] Appl. No.: 156,970

[22] Filed: Jun. 6, 1980

[51] Int. Cl.³ .............................................. H01G 7/00
[52] U.S. Cl. ...................................... 361/283; 65/43; 73/724
[58] Field of Search .................. 361/283; 73/718, 724; 65/43, 59 A

[56] References Cited

U.S. PATENT DOCUMENTS

| | | | |
|---|---|---|---|
| 4,168,518 | 9/1979 | Lee | 361/283 |
| 4,177,496 | 12/1979 | Bell | 361/283 |
| 4,184,189 | 1/1980 | Davis | 361/283 |

Primary Examiner—E. A. Goldberg
Attorney, Agent, or Firm—Markell Seitzman

[57] ABSTRACT

A capacitive pressure transducer having a first flexible electrically insulative diaphragm disposed apart from a second electrically insulative member, including a second flexible diaphragm, and where the diaphragm and member include metalized portions thereon forming the plates of a pressure sensing capacitor.

The transducer further includes a pair of electrically insulative sealing rings disposed concentrically about one another which function to space said diaphragm and member apart and which form a hermetically sealed cavity therebetween, to establish the pressure sensitive region of the diaphragm and to reduce the tensile forces in the inner most sealing ring.

10 Claims, 3 Drawing Figures

CAPACITIVE PRESSURE TRANSDUCER

BACKGROUND AND SUMMARY OF THE INVENTION

This invention relates to pressure transducers and more particularly to pressure transducers utilizing glasseous sealing materials to join a flexible diaphragm to another part of the pressure transducer.

There exists in the prior art several types of capacitive and strain gage pressure transducers. These pressure transducers often comprise a first flexible diaphragm that is sealed to a second portion of the pressure transducers such as another flexible diaphragm or a more rigid base structure by a peripheral glasseous or epoxy seal. These pressure transducers have at least one common deficiency. The deficiency is that after prolonged exposure of the transducer to a cyclically varying pressure or exposure to high levels of pressure the seal will tend to crack or otherwise develop hairline fissures therethrough. These cracks or fissures permit the volume between the diaphragm and seal to become contaminated, leak or otherwise lose its evacuated pressure characteristics. The degradation of the physical integrity of the peripheral seal is a result of the combined compressive and tensile forces which are imparted thereto during periods involving pressure loading. In addition, the prior art transducers are subject to hysteresis due to the frictional or sliding deformation resulting from the movement of the diaphragms. The movement of the diaphragms further causes a zero or null shift therein changing the sensitivity of the pressure transducer. These deficiencies are further amplified when the pressure transducer is required to measure pressures that exceed atmospheric pressure and which may reach or exceed 1000 psi.

It is a broad object of the present invention to remedy those deficiencies in the prior art. More specifically, it is an object of the present invention to provide a pressure transducer having an improved long lasting seal. Another object of the present invention is to reduce the tensile and compressive stresses developed on the seal due to the applied pressure environment. A further object of the present invention is to provide a pressure capsule having a wide dynamic range and having a high uniform sensitivity.

The present invention relates to a quartz capacitive pressure transducers having a pair of electrically insulated elastic diaphragms, preferably made of fused quartz, that are disposed adjacent one another and bonded together by a first glass frit in a spaced apart relationship to form a sealed cavity therebetween. This sealed cavity may be evacuated to whatever degree necessary to provide for the required sensitivity of the pressure transducer consistent with the environment to be measured. The pressure transducer further comprises a second glass frit located in a surrounding relationship to the first glass frit and having a center that is maintained coaxial with the center of the first frit. The pressure transducer further includes a number of conductive electrode layers applied to the underside of diaphragms, within the sealed cavity, to provide a plurality of conductive surfaces to form a pressure sensitive capacitor. One skilled in the art will appreciate that strain gages and the like may be substituted for the capacitive electrodes. Electrical communications with the capacitive plates can be obtained by passing wires through the elastic diaphragms or by extending the electrode materials under the seals to the periphery of the diaphragms. An advantage of this dual setting ring arrangement is that capacitive pressure transducers so constructed are capable of being utilized in high pressure environments. These capacitive transducers will also display an increased useful lifetime because of the significant reduction in tensile forces which act through the inner sealing ring to crack and reduce the structure integrity of the seal. This cracking causes the vacuum within the cavity to be lost or significantly reduced due to increased leakage arising from minute cracks therein. Many other objects, features and advantages of the invention will be clear from the following detailed description of the drawings.

DETAILED DESCRIPTION OF THE DRAWINGS

Figure 1:
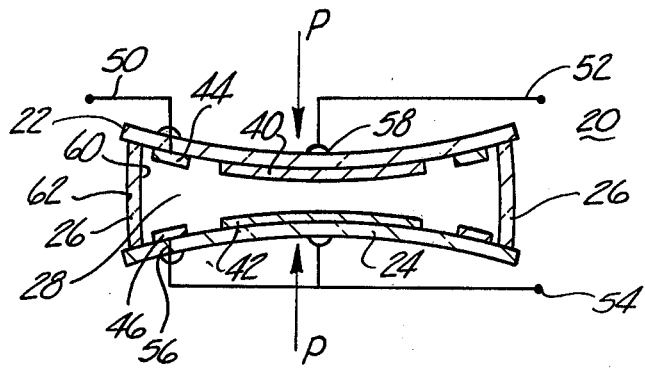
FIG. 1 is a cross-sectional view of a flat plate capacitive pressure sensor not incorporating the present invention.

Reference is now made to FIG. 1 which illustrates a cross-sectional view of a flat plate pressure transducer 20. More particularly, the transducer 20 is shown in a stressed position resulting from the application of a pressure environment (P) to be measured. The pressure transducer 20 is fabricated using at least one flexible diaphragm 22 or the plurality of flexible diaphragms 22 and 24. Preferably these diaphragms are fabricated from a material exhibiting zero or minimal hysteresis and further exhibiting a low temperature coefficient of expansion that is compatible with the sealing material and other parts of the transducer 20. Typical of materials exhibiting this behavior are: quartz, Pyrex and the like. The diaphragms 22 and 24 are spaced apart by a single annular spacer 26 which serves to establish a cavity 28. The circumferential spacer 26 defines the pressure sensitive regions of the adjacent diaphragms and provides a peripheral seal therebetween. The transducer 20 further comprises a plurality of conductive electrodes deposited on the surfaces of the respective diaphragms 22 and 24 within the cavity 28 and under the pressure sensitive regions. In the embodiment illustrated in FIG. 1 the electrodes comprise centrally located circular portions 40 and 42 which are placed upon the respective diaphragms (22 24) and located coaxially with the spacer 26. In addition, the transducer 20 further includes a second pair of electrodes 44 and 46 which are deposited to the undersurfaces of the diaphragms 22 and 24 near the extremes of the pressure sensitive regions in a manner so that they too are coaxially situated to the electrode pair 40,42 and the seal 26. The transducer 20 further includes a plurality of lead wires 50, 52 and 54 connecting electrodes 44, 40 and the combination 42 and 46 respectively. These wires (50, 52, and 54) are connected to the appropriate electrodes through feedthrough passages 56 which are later sealed by an epoxy 58 or like sealing material to protect and seal the environment within cavity 28. The precise relationship of the electrodes is not important to the present invention. A variety of electrode relationships such as the one illustrated in FIG. 1 which illustrates the use of a sensing capacitor, Cs, comprising the electrode pair 40 and 42 and a reference capacitor Cr comprising the electrode pair 44 and 46. An inspection of FIG. 1 illustrates that when the transducer 20 is in a compressed position due to the application of the pressure force to be measured, the innermost portions 60 of the peripheral spacer 26 are in compression while the outermost surface 62 of the seal 26 are in tension. One should appreciate that the continued stressing of the seal 26 due to the combined compressive and tensile forces resulting from the continued flexing of the transducer 20 will cause premature failure of the seal material. This failure, as previously mentioned, may provide leakage paths for the external environment to flow into cavity 28 which destroy the structural integrity of the seal thereby changing the zero and scale factor of the transducer 20.

Figure 2:
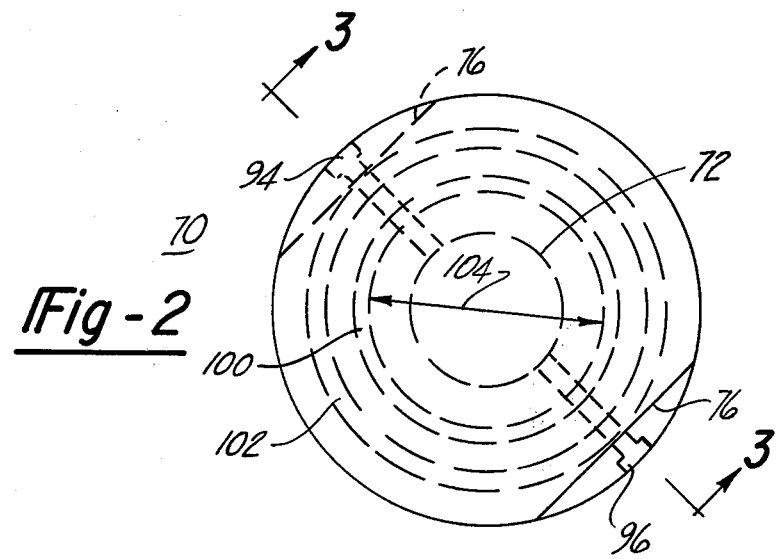
FIG. 2 is a top plan view of a pressure sensing capacitor incorporating the present invention.
Figure 3:
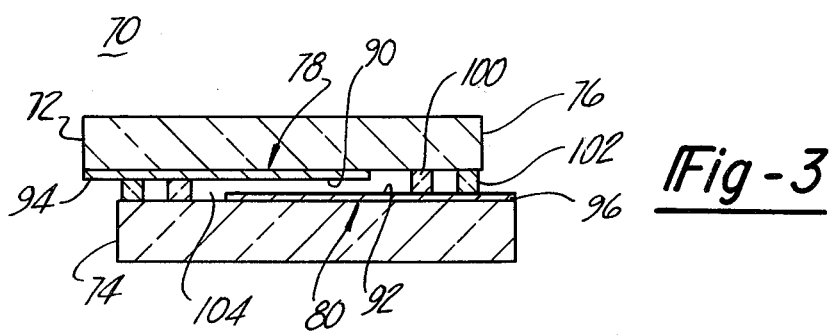
FIG. 3 is a sectional view of the pressure sensing capacitor taken along the section line 3—3 of FIG. 1.

Reference is now made to FIGS. 2 and 3 which illustrate respectively a top plan view and cross-sectional view of an improved capacitive pressure transducer 70. The capacitor 70 includes a pair of substantially flat, spaced apart, flexible diaphragms or plates 72 and 74. The preferred embodiment of the invention utilizes fused quartz because of its hysteresis free and low temperature coefficient characteristics. However, materials such as Pyrex or other ceramics, glasses or metals are applicable to practice the present invention. The use of quartz is highly advantageous in that quartz is chemically inert so that it will not corrode in adverse environments and furthermore, quartz will withstand considerable compressive forces which make it desirable to be incorporated within a high level pressure sensing transducer such as transducer 70. In addition, quartz exhibits substantially no hysteresis characteristics when subjected to periodic stresses and strains. Each diaphragm or plate 72 and 74 is preferably circular, while other shapes may be substituted, except for a small peripheral portion or cut-out 76 which has been removed from each plate. The purpose of truncating the diaphragms 72 or 74 is to permit convenient access to the electrodes and to eliminate the need for passthrough holes 56 and sealing material 58 as discussed in FIG. 1. It should be noted that depending upon the orientation and number of electrodes, each capacitive plate may contain additional cut-outs 76 located about the periphery of the diaphragms 72 and 74. As previously mentioned, the diaphragms 72 and 74 are fabricated from flexible plates of fused quartz or glass and that these plates 72, 74 may be polished or cut to a substantially uniform thickness and flatness.

Diaphragms 72 and 74 further include a layer of conductive material of a known type which may be applied to a thickness of several thousand angstroms to form the electrodes of the pressure sensitive capacitor. These layers are formed on the inner surfaces 78 and 80 of the respective diaphragms 72 and 74 by screen printing, vacuum evaporation, sputtering or other methods. Preferably the major portions of these electrodes are located within the pressure sensitive regions 106 of the diaphragms 72 and 74. In the embodiment illustrated in FIGS. 2 and 3, the electrodes comprise two circular main electrodes 90 and 92 having electrode leads 94 and 96 radially extending to the periphery of the diaphragms 92 and 94.

The diaphragms 92 and 94 are maintained in a spaced apart, parallel relationship by a pair of concentrically oriented annular seals 100 and 102. Preferably each of the seals 100 and 102 comprise a ring of a glass frit material disposed concentrically about the circular electrodes 90 and 92. As can be seen from FIGS. 2 and 3 the electrode leads 94 and 96 are formed on the nonoverlapping portions of the diaphragms 92 and 94, respectively, adjacent to the cut-outs 76, to allow easy electrical connection thereto. The leads 92 and 94 are integrally formed with electrodes 90 and 92, respectively, at the same time that the electrodes 90 and 94 are formed on the inner surfaces 78 and 80 of the diaphragms. In operation, when the environment to be measured is applied to the outer surfaces of diaphragms 72 and 74, the diaphragms will flex herein changing the spacing therebetween. This flexing will, in turn, vary the capacitance of the pressure sensor 70. The diaphragms (72, 74) will flex over the inner annular peripheral seal 100 therein establishing the pressure sensitive region 104. However because of the presence of the outer annular seal 102 that portion of either diaphragm 72 or 74 extending outward from the innermost portion of peripheral seal 100 will remain relatively fixed. In this manner, it can be seen that the tensile forces in the inner seal 100 have been substantially eliminated. It can be seen that the function of the inner seal 100 is to provide for a leak free seal about the periphery of cavity 104 as well as to provide the spacing between the two diaphragms 72 and 74. The outer coaxial peripheral seal 102 functions to take up the tensile forces in the outer perimeter of the inner seal 100 and to assist in maintaining the spacing between the diaphragms. By utilizing the disclosed structure of the present invention, it is possible to construct pressure sensors that may be used to repeatedly measure pressures up to and exceeding 1000 psi. The specification of the initial separation of the electrodes will vary with the expected environment to be sensed and with the specified sensitivity of the transducer 70. Typically, this spacing may range from less than 0.1 millimeters to 30 millimeters and may be controlled by controlling the amount of sealing material used or by utilizing other spacer means such as rods.

To assemble the capacitive pressure transducer 70 requires that the electrodes 90, 94 and 92, 96 be printed, sputtered or deposited to the respective diaphragms 72, 74 which have been situably finished to a specified flatness. The glass frit seals 100 and 102 are applied to either or both diaphragms 72, 74 in a circumferential coaxial relationship to the circular electrodes 90 and 92. The diaphragms 72 and 74 are then placed one on top of the other so that the circular electrodes 90 and 92 are maintained in substantial vertical alignment. The diaphragms 72 and 74 are thereafter sealed together by heating the transducer to a temperature sufficient to cause the peripheral seals 100 and 102 material to melt. The cavity 104 is then evacuated to a reference pressure by known methods. Many changes and modifications in the above described embodiment of the invention can, of course, be carried out without departing from the scope thereof. Accordingly, the scope is intended to be limited only by the scope of the appended claims.

What is claimed is:

1. A capacitive pressure transducer comprising:
   a first diaphragm having a pressure responsive region thereon and deflectable in response to the local pressure;
   first means spaced from said first diaphragm defining a gap therebetween;
   pressure responsive means applied to the said pressure responsive region of said first diaphragm for transducing said pressure to be measured into measurable signals;

dual sealing means for separating said first diaphragm and said first means, and for forming a plurality of sealed cavities therebetween surrounding said pressure responsive region.

2. The transducer as recited in claim 1 wherein said first means comprises an elastic diaphragm, having a pressure responsive region thereon deflectable in response to the local pressure, wherein said pressure responsive region is maintained in vertical alignment with the pressure responsive region of said first diaphragm.

3. The transducer as defined in claim 2 wherein said elastic diaphragm is an electrically insulating material.

4. The transducer as defined in claim 3 wherein said elastic diaphragm is a member having a substantial planar inner surface disposed adjacent to said cavities and having at least one electrically conductive electrode thereon forming the plates of at least one pressure responsive capacitor.

5. The transducer as defined in claim 3 or 4 wherein said diaphragms are quartz and said annular seals are a glass frit having thermal characteristics similar to the thermal characteristics of quartz.

6. The transducer as defined in claim 5 wherein said first means includes a second diaphragm having a pressure responsive region thereon and deflectable in response to the local pressure.

7. The transducer as defined in claim 1 where said dual sealing means comprises a pair of concentrically situated annular seals.

8. The transducer as defined in claim 7 wherein at least one of said cavities is pressurized to a specific pressure level.

9. The transducer as defined in claim 8 wherein the volumes between said annular seals and between said first diaphragm and said first means is pressurized to said same pressure level.

10. The transducer as defined in claims 8 or 9 wherein said pressure level includes a specified degree of vacuum pressure.

* * * * *